(12) United States Patent
Staudenrausch

(10) Patent No.: US 7,597,613 B2
(45) Date of Patent: Oct. 6, 2009

(54) METHOD AND DEVICE FOR FILLING PASTE-LIKE SUBSTANCES INTO SKINS

(75) Inventor: Martin Staudenrausch, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 12/256,844

(22) Filed: Oct. 23, 2008

(65) Prior Publication Data
US 2009/0111366 A1   Apr. 30, 2009

(30) Foreign Application Priority Data
Oct. 25, 2007   (EP) .................................. 07020939

(51) Int. Cl.
*A22C 11/00* (2006.01)
(52) U.S. Cl. ...................................................... 452/32
(58) Field of Classification Search ............. 452/30–35, 452/37, 46–48, 51
See application file for complete search history.

(56) References Cited
U.S. PATENT DOCUMENTS

| | | | |
|---|---|---|---|
| 4,646,386 A * | 3/1987 | Dreisin | 452/31 |
| 4,920,611 A | 5/1990 | Townsend | |
| 5,197,914 A * | 3/1993 | Powers | 452/32 |
| 5,203,735 A * | 4/1993 | Stanek | 452/38 |
| 5,378,193 A | 1/1995 | Stanley et al. | |
| 5,466,184 A | 11/1995 | May | |

OTHER PUBLICATIONS

Search Report for EP 07 02 0939 dated Dec. 4, 2007.

* cited by examiner

*Primary Examiner*—Thomas Price
(74) *Attorney, Agent, or Firm*—Marshall, Gerstein & Borun LLP

(57) ABSTRACT

A device and a method for filling a paste-like substance into a skin, and having a filling tube through which the paste-like substance is pushed into the skin, and a casing brake which is arranged in the area of the ejection end of the filling tube and which presses the skin in the direction of the filling tube. In order to prevent the formation of blisters below the skin, a second casing brake is provided, which, when seen in the direction of ejection, is arranged ahead of the first casing brake and which presses the skin in the direction of the filling tube so that air can be sucked off from below the skin between the first and the second casing brake.

11 Claims, 5 Drawing Sheets

METHOD AND DEVICE FOR FILLING PASTE-LIKE SUBSTANCES INTO SKINS

CROSS-REFERENCE TO RELATED APPLICATION

The present application claims the benefit of priority of European Patent Application No. 07020939.0, filed Oct. 25, 2007. The entire text of the priority application is incorporated herein by reference in its entirety.

FIELD OF THE DISCLOSURE

The present invention relates to a device and a method for filling a paste-like substance into a skin.

For filling a paste-like substance into a skin, e.g. a casing, sausage skin or a tubular bag, the skin is pushed onto a filling tube through which the substance is then filled into said skin. In order to allow said skin to be filled tightly and without inclusions of air, a so-called casing brake is pushed onto the skin at the end of the filling tube so as to slow the skin down and expel the air which is present between the filling tube and the skin. Depending on the substance to be filled into the skin, in particular if said substance is lumpy cooked ham, blisters may nevertheless form below the skin.

There are several possibilities of avoiding this, e.g. the use of "perforated" casings. These casings or skins are provided with small holes at regular intervals through which the air can escape due to the internal pressure prevailing in the filled sausage. Although the air can escape in accordance with the distance and the size of the holes, small air blisters often remain in the sausage. It may also happen that, when the casing is forced apart by the meat pieces after the casing brake, air may be drawn in through the openings and entrapped in the sausage which is just being formed. Such a skin or such a casing is not sterile and the substance contained therein may escape.

Another possibility is the use of a caliber ring, as discussed below.

SUMMARY OF THE DISCLOSURE

Starting from this prior art, it is the object of the present disclosure to provide a device and a method used for filling paste-like substances into skins and preventing a formation of blisters below the skin in an easy and reliable manner.

According to the present disclosure, the second casing brake can be arranged together with the conventional first casing brake in one go. The casing brake can either be pushed onto the filling tube or the filling tube can be introduced in the casing brakes. The arrangement according to the present disclosure can be used for different calibers, since it only has to be adapted to the filling tube, but not to the filled caliber. It is no longer necessary to draw the casing or the skin over a caliber ring; depending on how tightly the casing presses onto the caliber ring, this drawing of the casing over the caliber ring is very time consuming in practice. Taking all this into account, the handling will be simplified and the sausage skin will also be treated with care. "In the direction of the filling tube" means here simply inwards, irrespectively of whether the first or the second casing brake sealingly presses onto the surface of the filling tube or possibly onto a vacuum tube.

According to a preferred embodiment, the suction unit comprises a vacuum tube, which is arranged on the filling tube. This allows the air to be sucked off from below the skin between the first and the second casing brake via a hollow space between the vacuum tube and the filling tube. Also in this case the first and the second casing brake can be mounted very easily by simply pushing them onto the filling tube and the vacuum tube, respectively, or by introducing the filling tube and the vacuum tube together in the casing brake. Air can easily be sucked off from below the skin through the vacuum tube.

The formulation "that the vacuum tube is arranged on the filling tube" includes an arrangement outside of or within the filling tube.

According to a preferred embodiment, the vacuum tube is arranged around the filling tube and the first casing brake presses the skin against the filling tube and the second casing brake presses the skin against the vacuum tube. Such an embodiment can be produced easily by pushing e.g. the vacuum tube over a part of the filling tube. Due to the fact that the second casing brake presses against the vacuum tube thus sealing the skin on the vacuum tube and due to the fact that the first casing brake presses the skin against the filling tube, which is located further inwards, a step is defined so that the skin extends from the vacuum tube at an oblique angle to the filling tube. This allows the air to be sucked off from below the skin in a particularly effective manner and it provides good tension.

It is, however, also possible that the vacuum tube and the filling tube are arranged such that the first and the second casing brake press the skin against the vacuum tube. The air can then be sucked off via the hollow space between the vacuum tube and the filling tube through an opening in the vacuum tube.

According to an advantageous embodiment, the first and the second casing brake are implemented as a component with two brake rings. Such an arrangement is particularly compact and can be handled and produced easily.

The first and the second casing brake may, however, also be implemented as separate components which are adapted to be pushed separately from one another onto the filling tube and the vacuum tube. Depending on the respective auxiliary machine (e.g. clipper), the displacement path of the casing brake or of the filling tube into the casing brake is predetermined. In certain cases this displacement path may not suffice to remove the filling tube from both casing brakes. In these cases, the first and the second casing brake can be pushed on separately. The second casing brake can then be implemented such that it rests on the first casing brake during the filling process.

According to an advantageous embodiment, the device according to the present disclosure comprises a housing which seals a chamber between the first and the second casing brake against the skin. When the two casing brakes are sealingly connected, the casing used can also be a perforated casing. This kind of casing is used in certain cases so as to achieve higher cooking losses.

It will be advantageous to provide the housing with a vacuum connection so that a vacuum can be generated in the chamber between the casing brakes. The magnitude of the vacuum need not be identical with the magnitude of the vacuum for sucking the air off from below the skin. The fact that a vacuum can also be applied to the chamber between the two casing brakes allows a particularly effective use of perforated casings, without air being drawn in through the openings.

According to a preferred embodiment, the first and the second casing brake both press against the filling tube. When the above-described housing seals off the chamber between the first and the second casing brake and when a vacuum is generated in said chamber, air can be sucked off from below a perforated skin through the openings in said skin via the vacuum connection of said chamber. It follows that the housing with the vacuum connection can represent the suction unit. A separate vacuum tube will then not be necessary. In this way it can be guaranteed that, when perforated skins are used, no air will remain under the skin of the filled sausage. This arrangement is particularly easy to realize.

BRIEF DESCRIPTION OF THE DRAWINGS

In the following, the present invention will be explained in detail making reference to the figures following hereinbelow.

DETAILED DESCRIPTION OF THE PREFERRED EMBODIMENT

Figure 5:
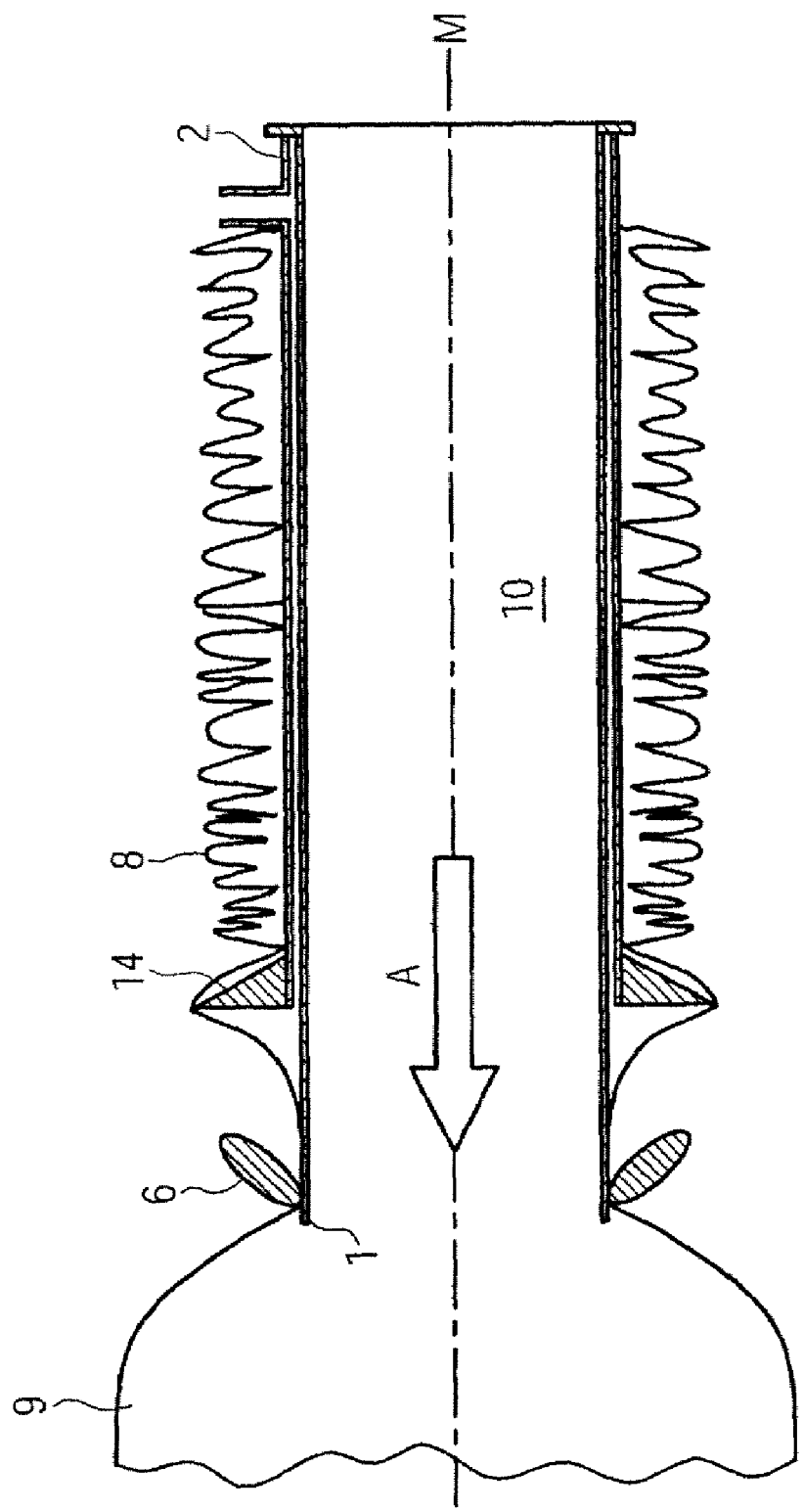
FIG. 5 shows a longitudinal section through a prior art device for filling paste-like substances into skins.

First, discussing the prior art and, as can especially be seen from FIG. 5, a vacuum tube is here arranged above and concentrically with the filling tube 1. The sausage casing 8, which is to be filled with the paste-like substance, is now pushed onto this vacuum tube. The caliber ring 14 is attached to the end of the vacuum tube 2 and the casing 8 is then guided and drawn off over said caliber ring. This caliber ring widens the skin approximately to the nominal caliber of the sausage skin thus sealing the skin at this point. The casing brake is then pushed onto the actual filling tube (or the filling tube is introduced in the casing brake). When the vacuum is now applied to the vacuum tube, the air can be sucked off from below the skin between the caliber ring and the casing brake. Although this solution allows the air to be effectively sucked off from below the skin, the handling in the case of casing change processes will be much more complicated, since it will first be necessary to remove the caliber ring, whereupon the gathered sausage skin must be pushed onto the vacuum tube and the caliber ring 14 must then again be sealingly secured to the vacuum tube 2. Subsequently, the sausage skin must be drawn over the caliber ring by hand, and this may cause damage to sensitive casings. Only when all this has been done can the filling tube be reintroduced in the casing brake. In addition, a suitable caliber ring is required for each caliber to be filled.

Figure 1:
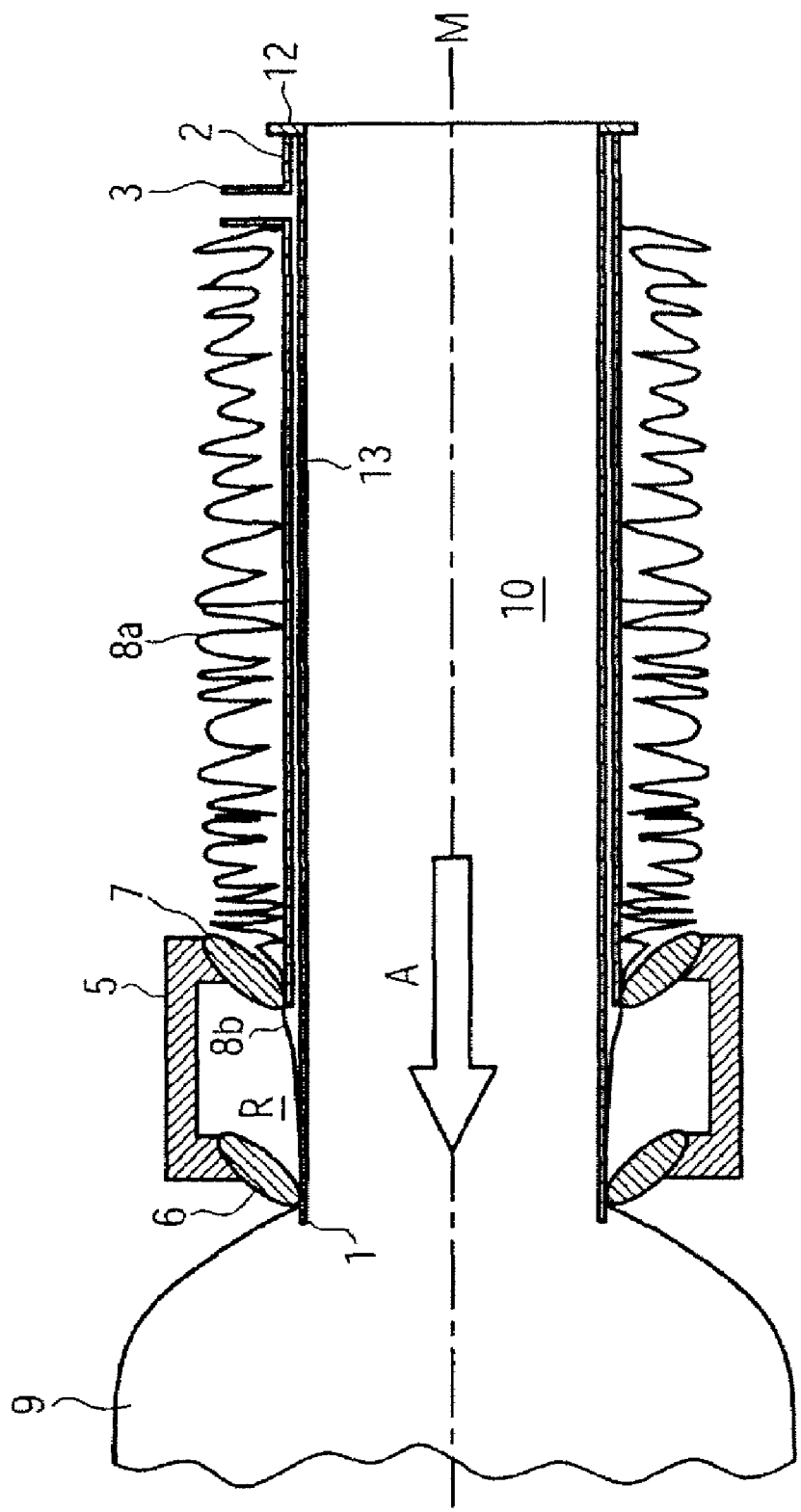
FIG. 1 shows a longitudinal section through a first embodiment of the present disclosure.

Turning now to FIG. 1, it shows a first embodiment of a device for filling paste-like substances into skins according to the present disclosure. The device comprises a filling tube 1 through which a paste-like substance 10 is ejected into a sausage skin 8a, 8b so as to produce a filled sausage 9. The filling material is here supplied to the filling tube 1 e.g. in a manner known via a hopper, which is not shown, with a suitable conveying mechanism, e.g. a vane pump, so that the filling material can be ejected in the direction of ejection A.

A vacuum tube 2 is here concentrically pushed onto the filling tube 1. In the present embodiment, the vacuum tube 2 does not extend in full length over the filling tube 1 so that the filling tube 1 is exposed at least in the area of the ejection end. The vacuum tube 2 is open at the front in the direction of ejection so that an open annular gap is obtained. Hence, a hollow space 13 is obtained between the filling tube 1 and the vacuum tube 2. The vacuum tube 2 is additionally provided with an opening or connection 3 for generating a vacuum, the opening 3 being connected to a pump via a respective line, which is not shown. The end of the hollow space 13 constituting the rear end when seen in the direction of ejection A is here closed e.g. by an annular disk 12. The filling tube and the vacuum tube are preferably round in cross-section.

In the area of the ejection end of the filling tube 1 a first casing brake 6 is provided, which presses the sausage skin 8b in the direction of the filling tube, i.e. inwards. The casing brake 6 presses here against the filling tube 1. The casing brake 6 is provided with a circumferentially extending brake ring which is made of elastic material and which is pretensioned such that it presses against the skin so as to slow it down in the manner known and so as to expel the air which is present between the filling tube and the skin 8b. The device is additionally provided with a second casing brake 7 which, too, presses inwards, i.e. in the direction of the filling tube. In this embodiment, the casing brake 7 presses against the vacuum tube, and here against the end portion of the vacuum tube 2. The casing brake 7 comprises also in this case a circumferentially extending brake ring which is made of elastic material and which is pretensioned such that it sealingly presses the sausage skin against the vacuum tube 2. As can especially be seen from FIG. 1, the sausage skin 8a is gathered on the vacuum tube. It follows that a unit for sucking off air from below the skin 8b comprises here the vacuum tube 2 as well as the hollow space 13 with the connection 3.

In the embodiment shown in FIG. 1, the first and the second casing brake 6, 7 are implemented as a component with two brake rings. A common brake ring housing 5 is provided for the brake rings. Such a dual casing brake is compact, it has a simple structural design and, in addition, it can be mounted easily by pushing it over the filling tube and the vacuum tube, or by inserting the filling tube and the vacuum tube into the casing brake. The chamber R between the first and the second casing brake 6, 7 is advantageously sealed against the skin 8b by the housing 5. Also the housing 5 is arranged in a circumferentially extending manner. Although this is not shown here, the housing can be provided with an opening (cf. e.g. FIG. 2, opening 11) which can again be used for pumping air out of the chamber R so as to generate a vacuum. When the first and the second casing brake 6, 7 are sealingly connected to one another so that also the chamber R can be evacuated, the casing used can also be a perforated casing. This kind of casing is used in certain cases so as to achieve higher cooking losses. The casing brake 7 can here be used advantageously for different calibers, since it only has to be adapted to the vacuum tube 2 but not to the caliber of the filled sausage, as in the case of the prior art. However, the magnitude of the vacuum within the chamber R need not be identical with the vacuum below the vacuum tube 2. The vacuum within the chamber R is approx. in the range of 100-500 mbar. The vacuum within the hollow space 13 is approx. in the range of 100-500 mbar.

The device shown in FIG. 1 operates as follows:

a paste-like substance 10, e.g. sausage meat, is conveyed in the direction of ejection A through the above-described conveying unit. This has the effect that the sausage skin is drawn off from the filling tube 1. The sausage skin 8a is arranged around the vacuum tube 2 in a gathered mode of arrangement. The casing brake 7 presses the sausage skin onto the vacuum tube 2 thus sealing it against said vacuum tube. The casing brake 6 presses the sausage skin 8b onto the filling tube 1 thus sealing the skin also here against said filling tube 1. Through the vacuum connection 3, air is pumped out of the hollow space 13 so that air is sucked off from below the skin 8b between the first and the second casing brake 6, 7. A formation of blisters below the skin will be avoided in this way. As has been described hereinbefore, a vacuum can simultaneously be applied to the chamber R between the casing brakes 6, 7 above the skin 8b. Air inclusions will not occur in the filled sausage 9.

Figure 2:
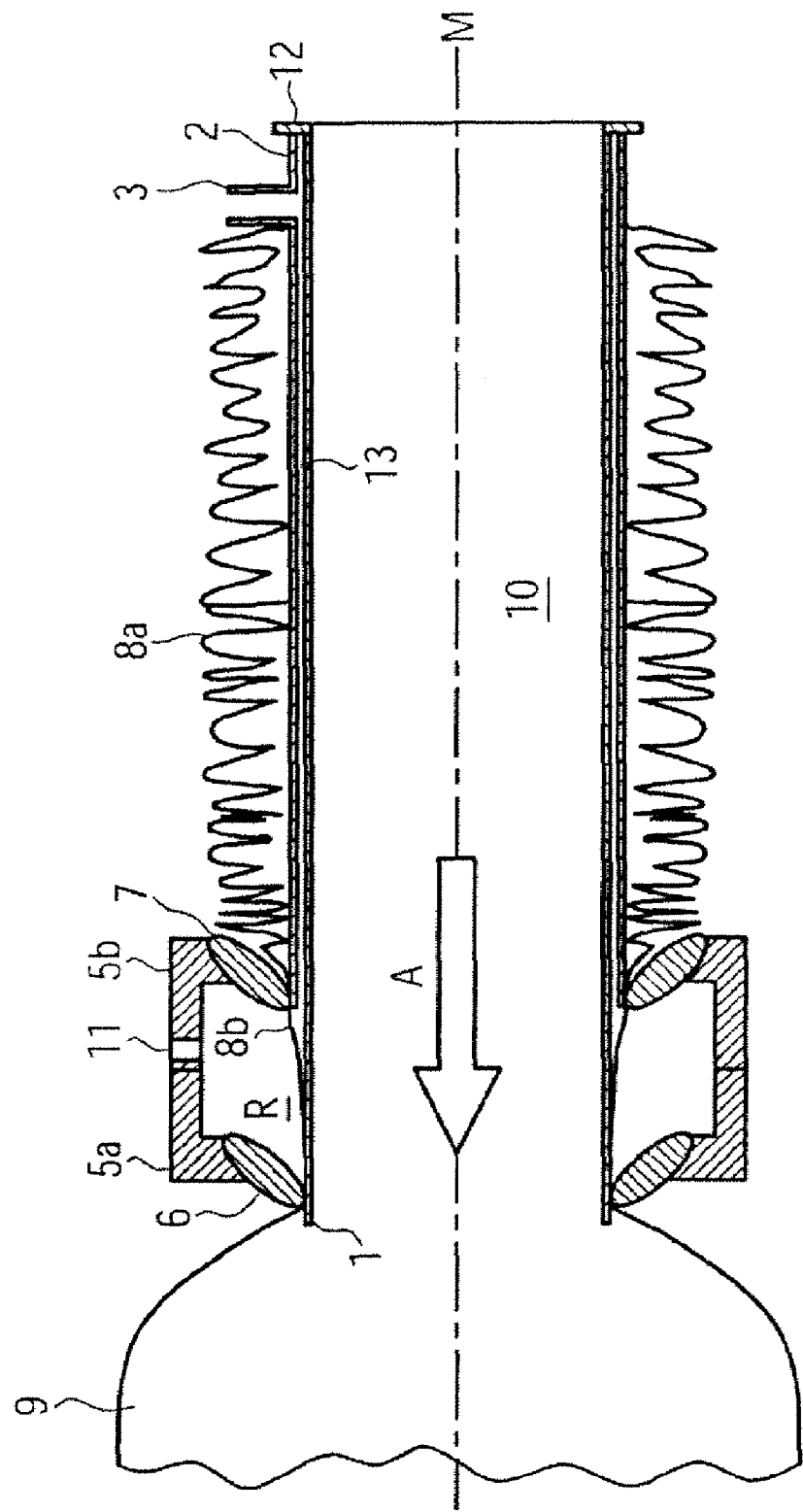
FIG. 2 shows a longitudinal section through a second embodiment of the present disclosure.

FIG. 2 shows a further embodiment of the present disclosure which essentially corresponds to the embodiment shown in FIG. 1, the first and the second casing brake 6, 7 being here, however, separate components, i.e. the dual casing brake is implemented as a bipartite component. This has the advantage that the two parts can be mounted separately on the filling tube and the vacuum tube, respectively. The housing 5b of the second casing brake 7 rests on the housing 5a of the first casing brake 6 in the mounted condition. If necessary, a sealing means is additionally provided for sealing the circumferentially extending housing components 5a, b. The bipartite structural design of the dual casing brake is advantageous, since, depending on the respective auxiliary machine (e.g. clipper), the displacement path of the casing brake or of the filling tube into the casing brake is predetermined. In certain cases this displacement path may not suffice to remove the filling tube from both casing brakes. Due to the bipartite structural design, the two casing brakes can, however, be arranged easily and securely even if the displacement paths should be very small.

Also this embodiment may comprise a vacuum connection 11 for evacuating the chamber R. The mode of operation of the embodiment shown in FIG. 2 corresponds to that shown in FIG. 1.

Figure 3:
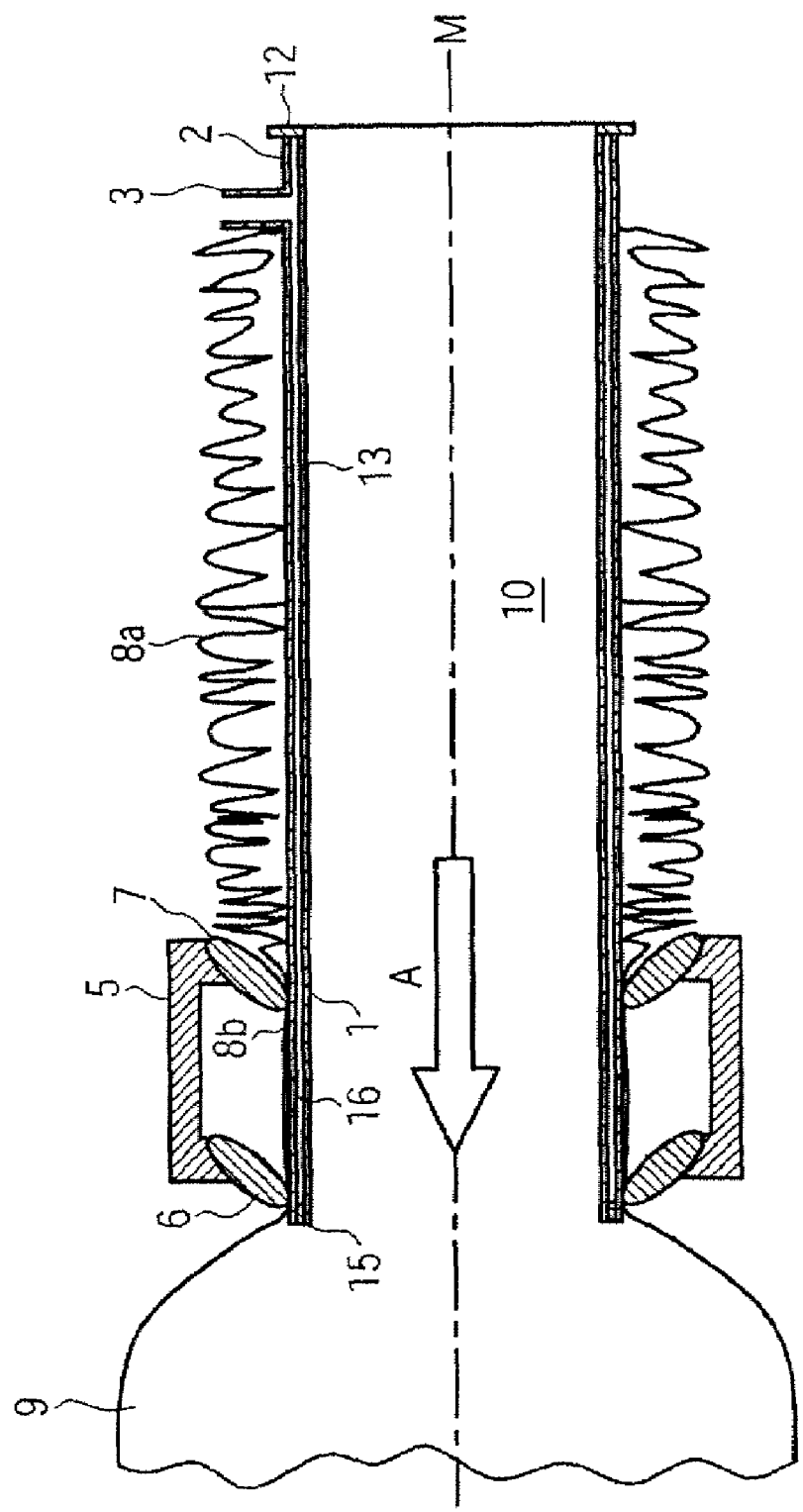
FIG. 3 shows a longitudinal section through a further embodiment of the present disclosure.

FIG. 3 shows a further possible embodiment of the present disclosure. The embodiment shown in FIG. 3 corresponds to the embodiments shown in FIGS. 1 and 2, with the exception that the vacuum tube 2 extends up to and into the area of the discharge end of the filling tube 1 at least to such an extent that also the first casing brake 6 presses the skin against the vacuum tube 2. The hollow space 13 is here sealed by a closing means 15 at the side constituting the rear side when seen in the direction of ejection, or it is simply closed by welding at this side.

Just as in the case of the first and second embodiments, the second casing brake 7 again presses the skin 8a against the vacuum tube 2. In order to suck off air from below the skin 8b between the first and the second casing brake 6, 7 in accordance with the present disclosure, at least one opening 16 is provided in the vacuum tube 2 so that air can be sucked off via the hollow space 13. It goes without saying that this embodiment can also be provided with a vacuum connection 11 in the one-piece or bipartite housing 5.

Although this is here not shown in the figures, the vacuum tube may also be arranged such that it does not extend around the filling tube 1 on the outer side thereof, but such that it extends, at least partially, along the inner side of the filling tube 1; in this case, the filling tube 1 is provided with a suitable opening for pumping off air from below the skin 8b between the two casing brakes 6 and 7 via the outwardly sealed hollow space between the vacuum tube and the filling tube through a respective vacuum opening.

Irrespectively of the precise structural design and arrangement of the vacuum tube, it is only of essential importance that the skin 8a, 8b is pressed inwards, i.e. in the direction of the filling tube, and sealed by a dual casing brake 6, 7 and that the air below the skin 8b between the two casing brakes 6, 7 can be pumped off via a hollow space 13 between the filling tube 1 and the vacuum tube 2. Such a dual casing brake can easily be mounted on the filling tube and the vacuum tube, respectively. The second casing brake 7 need not be adapted to the casing caliber in question, but it can be used for all calibers which are filled with the same filling tube and vacuum tube. This will facilitate the handling to a great extent. Since it is possible to mount the casing brake 7 together with the casing brake 6 on the filling tube essentially in one go, the method is substantially simplified.

Figure 4:
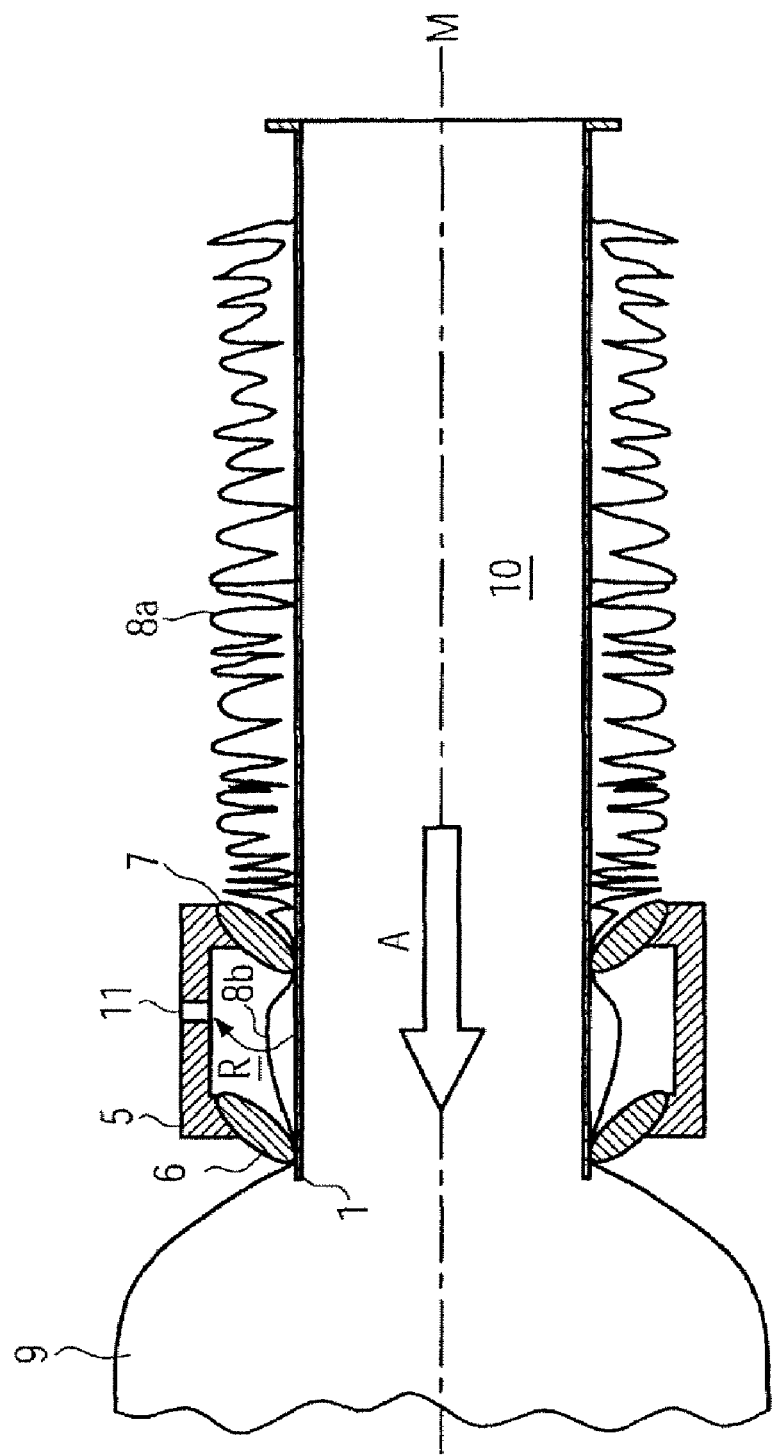
FIG. 4 shows a longitudinal section through a further embodiment of the present disclosure.

FIG. 4 shows another possible embodiment of the present disclosure.

Also this embodiment comprises, like the embodiments shown in FIGS. 1 to 3, a first and a second casing brake 6, 7 which both press against the filling tube 1 and seal the skin 8b against the filling tube 1. This arrangement is suitable for use with perforated skins having openings, as has been described hereinbefore. The unit for sucking off air from below the skin 8b comprises here the housing 5, which can be implemented as a one-piece or as a bipartite housing, and which seals the chamber R between the first and the second casing brake 6, 7 against the skin 8b. The housing 5 is here provided with the vacuum connection 11 so that a vacuum can be generated in the chamber R via a pump, which is not shown. It is thus possible to apply the vacuum only to the chamber R so that the air will be sucked off from below the skin through the holes in the sausage skin. In this case, the vacuum tube 2 can be dispensed with. Due to the fact that the air is drawn off from below the skin 8b between the casing brakes 6, 7, the filled sausage 9 will not contain any residual air below the skin. The embodiment shown in FIG. 4 is advantageous, since the dual casing brake can easily be attached to conventional filling tubes 1. This will facilitate the handling to a decisive extent. In the case of the perforated casing or the perforated skin, the openings amount to approx. 0.1% of the skin surface. An opening has a size of 0.1 mm to 1 mm. The vacuum generated in the chamber R is again in a range of 100 to 500 mbar. The structural design of the dual casing brake 6, 7 corresponds to the structural design which has been described in the preceding embodiments.

I claim:

1. A device for filling a paste-like substance into a skin, comprising:
    a filling tube through which the paste-like substance is pushed into the skin,
    a first casing brake arranged in the area of the ejection end of the filling tube and pressing the skin in the direction of the filling tube,
    a second casing brake which, when seen in the direction of ejection, is arranged prior to the first casing brake and which presses the skin in the direction of the filling tube;
    a suction unit for sucking off air from below the skin between the first and the second casing brake,
    a housing which seals a chamber between the first and the second casing brake against the skin, the housing having a vacuum connection so that a vacuum can be generated in the chamber, and
    wherein the first and the second casing brake press against the filling tube in such a way that air below a perforated skin can be sucked off through the openings of said skin via the vacuum connection of the chamber.

2. A device according to claim 1, wherein the suction unit comprises a vacuum tube, which is arranged on the filling tube, so that air can be sucked off from below the skin between the first and the second casing brake via a hollow space between the vacuum tube and the filling tube.

3. A device according to claim 2, wherein the vacuum tube is arranged around the filling tube in such a way that the filling tube is exposed at least in the area of the ejection end, and that the first casing brake presses the skin against the filling tube and that the second casing brake presses the skin against the vacuum tube.

4. A device according to claim 2, wherein the vacuum tube is arranged around the filling tube and that the first and the second casing brake press the skin against the vacuum tube.

5. A device according to claim 1, wherein the first and the second casing brake are implemented as a component with two brake rings.

6. A device according to claim 1, wherein the first and the second casing brake are separate components which are adapted to be attached separately from one another to the filling tube and the vacuum tube.

7. A method of filling a paste-like substance into a skin with a device according to claim 1, comprising:
   ejecting the paste-like substance into the skin through the filling tube,
   wherein the second casing brake presses the skin in the direction of the filling tube and also the first casing brake presses the skin in the direction of the filling tube,
   sucking the air off from below the skin between the first and the second casing brake, and
   wherein the first and the second casing brake press against the filling tube and that air is sucked off from below a perforated skin through the openings in said skin due to the vacuum in the chamber.

8. A method of filling a paste-like substance into a skin with a device according to claim 1, comprising:
   ejecting the paste-like substance into the skin through the filling tube,
   wherein the second casing brake presses the skin in the direction of the filling tube and also the first casing brake presses the skin in the direction of the filling tube,
   sucking the air off from below the skin between the first and the second casing brake, by generating a vacuum between the filling tube and a vacuum tube arranged on said filing tube, and
   wherein one of the second casing brake presses the skin against the vacuum tube and the first casing break presses the skin against the filling tube, or the first and the second casing break press the skin against the vacuum tube.

9. A device for filing a paste-like substance into a skin, comprising:
   a filling tube through which the paste-like substance is pushed into the skin,
   a first casing brake arranged in the area of the ejection end of the filling tube and pressing the skin in the direction of the filling tube,
   a second casing brake which, when seen in the direction of ejection, is arranged prior to the first casing brake and which presses the skin in the direction of the filling tube,
   a suction unit for sucking off air from below the skin between the first and second casing brake,
   wherein the suction unit comprises a vacuum tube, which is arranged on the filling tube, so that air can be sucked off from below the skin between the first and the second casing brake via a hollow space between the vacuum tube and the filling tube, and
   wherein the vacuum tube is arranged around the filling tube in such a way that the filling tube is exposed at least in the area of the ejection end, and that the first casing brake presses the skin against the filling tube and that the second casing brake presses the skin against the vacuum tube.

10. A device for filing a paste-like substance into a skin, comprising:
    a filling tube through which the paste-like substance is pushed into the skin,
    a first casing brake arranged in the area of the ejection end of the filling tube and pressing the skin in the direction of the filling tube,
    a second casing brake which, when seen in the direction of ejection, is arranged prior to the first casing brake and which presses the skin in the direction of the filling tube,
    a suction unit for sucking off air from below the skin between the first and second casing brake, and
    wherein the first and the second casing brake are separate components which are adapted to be attached separately from one another to the filling tube and the vacuum tube.

11. A method of filling paste-like substance into a skin with a device according to claim 10, comprising:
    ejecting the paste-like substance into the skin through the filling tube,
    wherein the second casing brake presses the skin in the direction of the filling tube and also the first casing brake presses the skin in the direction of the filling tube, and
    sucking the air off from below the skin between the first and the second casing brake.

* * * * *